(12) United States Patent
Muller et al.

(10) Patent No.: US 7,897,898 B2
(45) Date of Patent: Mar. 1, 2011

(54) HEAT GENERATOR COMPRISING A MAGNETO-CALORIC MATERIAL AND THERMIE GENERATING METHOD

(75) Inventors: Christian Muller, Strasbourg (FR); Jean-Louis Dupin, Muntzenheim (FR); Jean-Claude Heitzler, Horbourg-Wihr (FR)

(73) Assignee: CoolTech Applications S.A.S., Andolsheim (FR)

( * ) Notice: Subject to any disclaimer, the term of this patent is extended or adjusted under 35 U.S.C. 154(b) by 1145 days.

(21) Appl. No.: 10/593,845

(22) PCT Filed: Mar. 29, 2005

(86) PCT No.: PCT/FR2005/000741
§ 371 (c)(1), (2), (4) Date: Sep. 21, 2006

(87) PCT Pub. No.: WO2005/095872
PCT Pub. Date: Oct. 13, 2005

(65) Prior Publication Data
US 2008/0223853 A1    Sep. 18, 2008

(30) Foreign Application Priority Data
Mar. 30, 2004  (FR) .................................. 04 03300

(51) Int. Cl.
*H05B 6/04*    (2006.01)
*F25B 21/00*   (2006.01)
*F25B 9/00*    (2006.01)

(52) U.S. Cl. .................................. 219/672; 62/3.1; 62/6

(58) Field of Classification Search ................ 62/3.1, 62/6, 335; 219/660, 661, 663, 667, 666, 219/672, 673, 236
See application file for complete search history.

(56) References Cited

U.S. PATENT DOCUMENTS

| | | | | |
|---|---|---|---|---|
| 6,526,759 | B2 * | 3/2003 | Zimm et al. | 62/3.1 |
| 6,595,004 | B1 | 7/2003 | Ghoshal | |
| 6,668,560 | B2 * | 12/2003 | Zimm et al. | 62/3.1 |
| 7,596,955 | B2 * | 10/2009 | Muller et al. | 62/3.1 |

FOREIGN PATENT DOCUMENTS

| | | |
|---|---|---|
| JP | 2002195683 | 7/2002 |
| WO | WO 03/050456 | 6/2003 |

* cited by examiner

*Primary Examiner* — Quang T Van
*Assistant Examiner* — Hung Nguyen
(74) *Attorney, Agent, or Firm* — Davis & Bujold, P.L.L.C.

(57) ABSTRACT

A heat generator comprising a magneto-caloric material and a method for generating efficient and reliable thermies enabling of substantially limiting displaceable inert masses in order to produce a magnetic field variation required for obtaining a magneto caloric effect and usable by individuals and/or industries. The generator (10) comprises magneto caloric thermal elements (Ti) which are circularly arranged and crossed by conduits containing coolant flowing therethrough and magnetic elements (Gi) exposing the thermal elements (Ti) to a magnetic field action. The generator (10) also comprises magnetic divergence (mj) elements arranged between the thermal elements (Ti) and the magnetic elements (Gi) and coupled to displacement mechanism (not represented) for moving from one thermal element (Ti) to another thermal element (Ti+1) and initiating the magnetic flux variation in the thermal elements (Ti), thereby promoting the calorie and/or frigorie generation. The generator (10) can be used for tempering, cooling, heating, conserving, drying and air-conditioning.

28 Claims, 7 Drawing Sheets

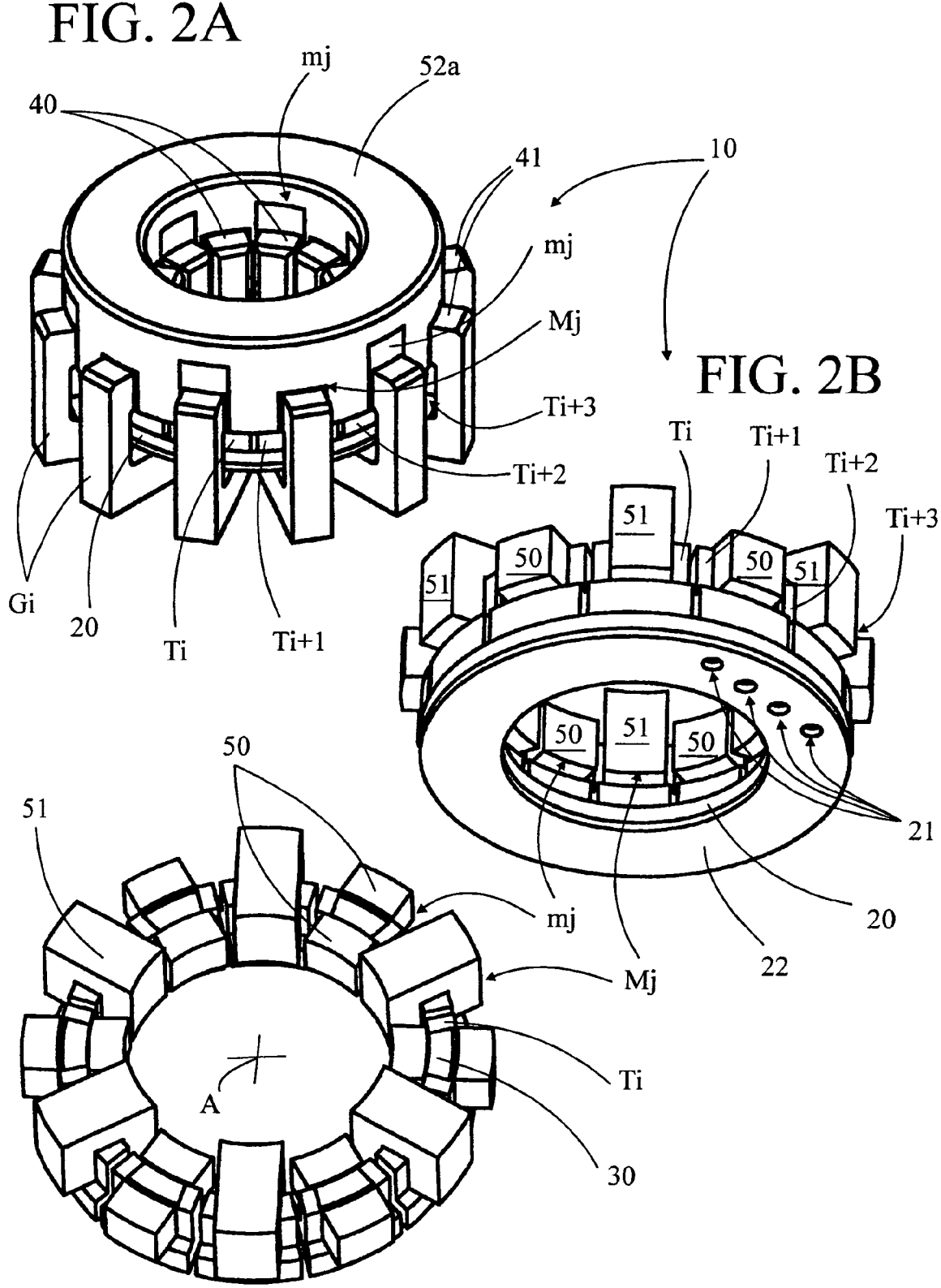

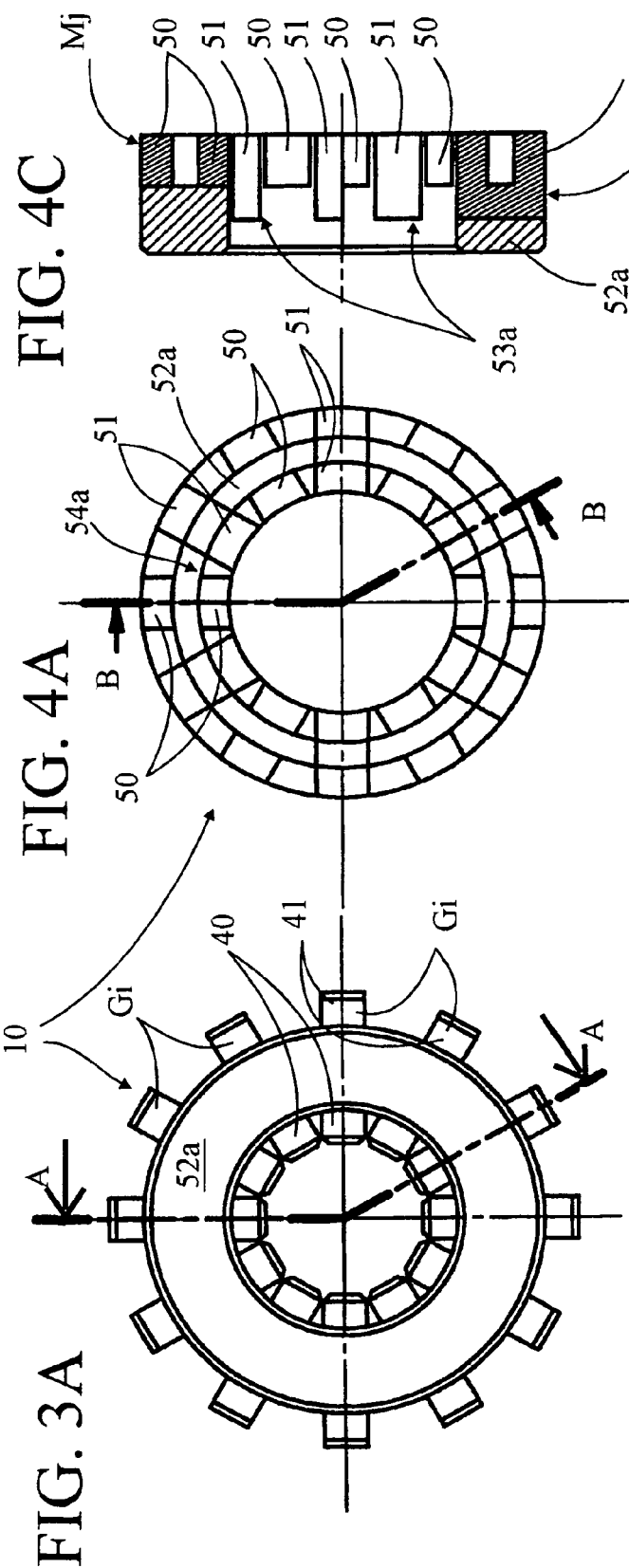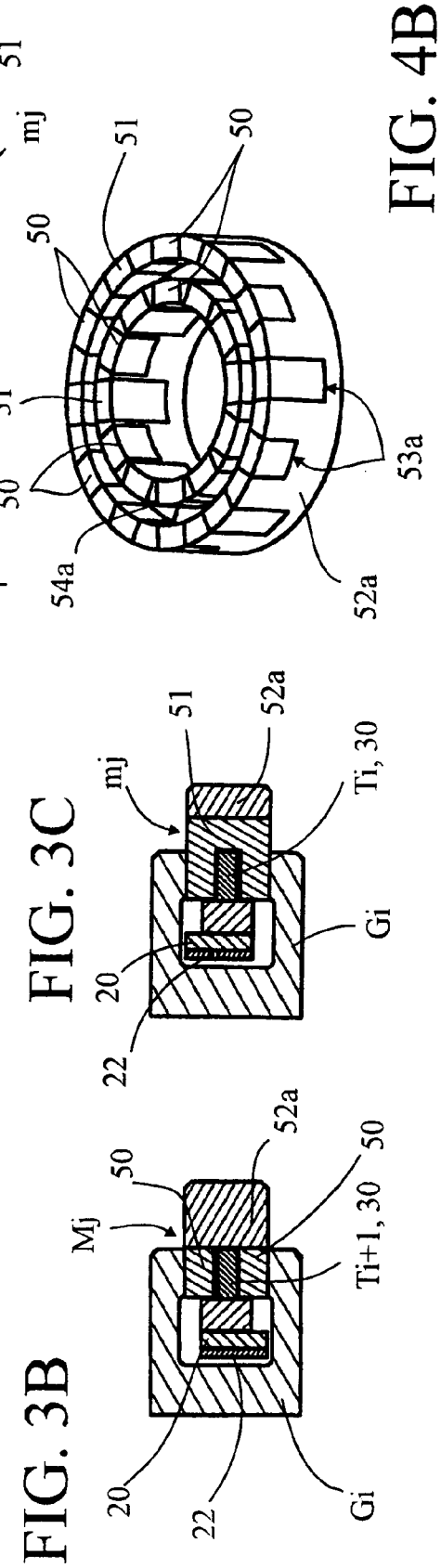

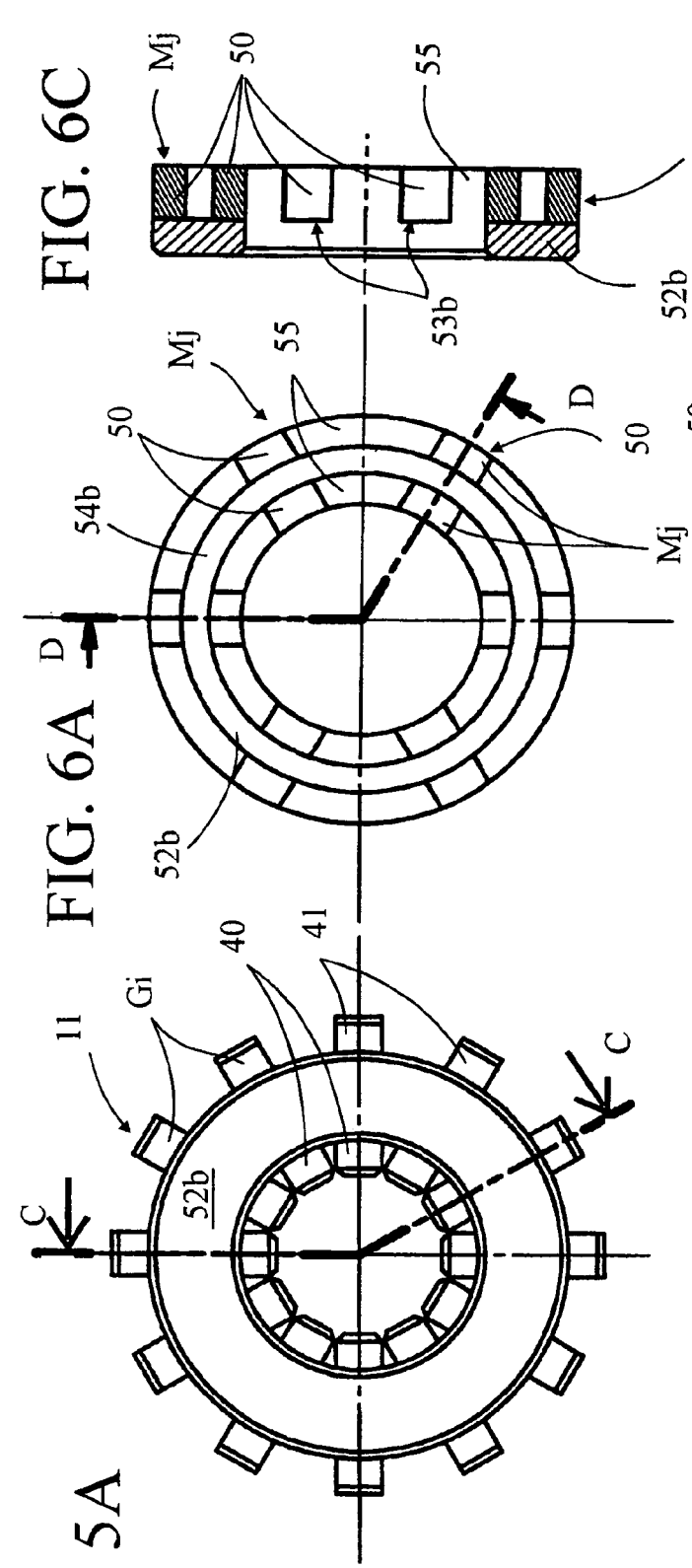
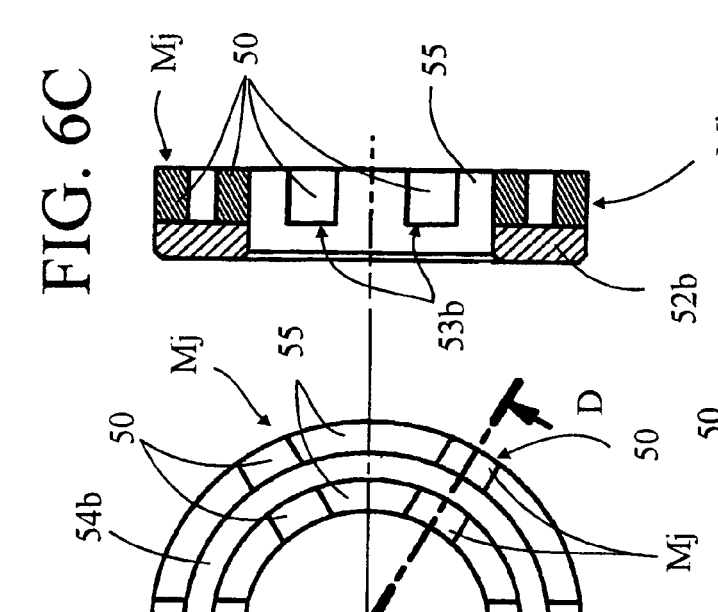
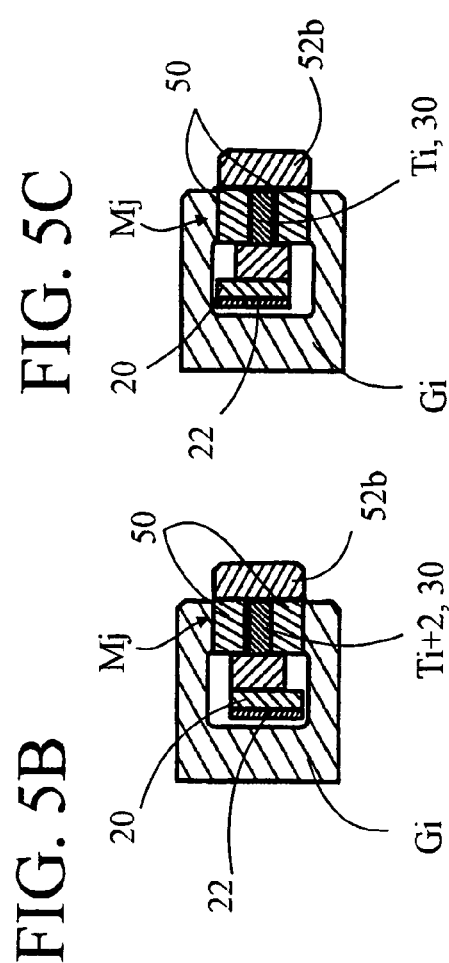

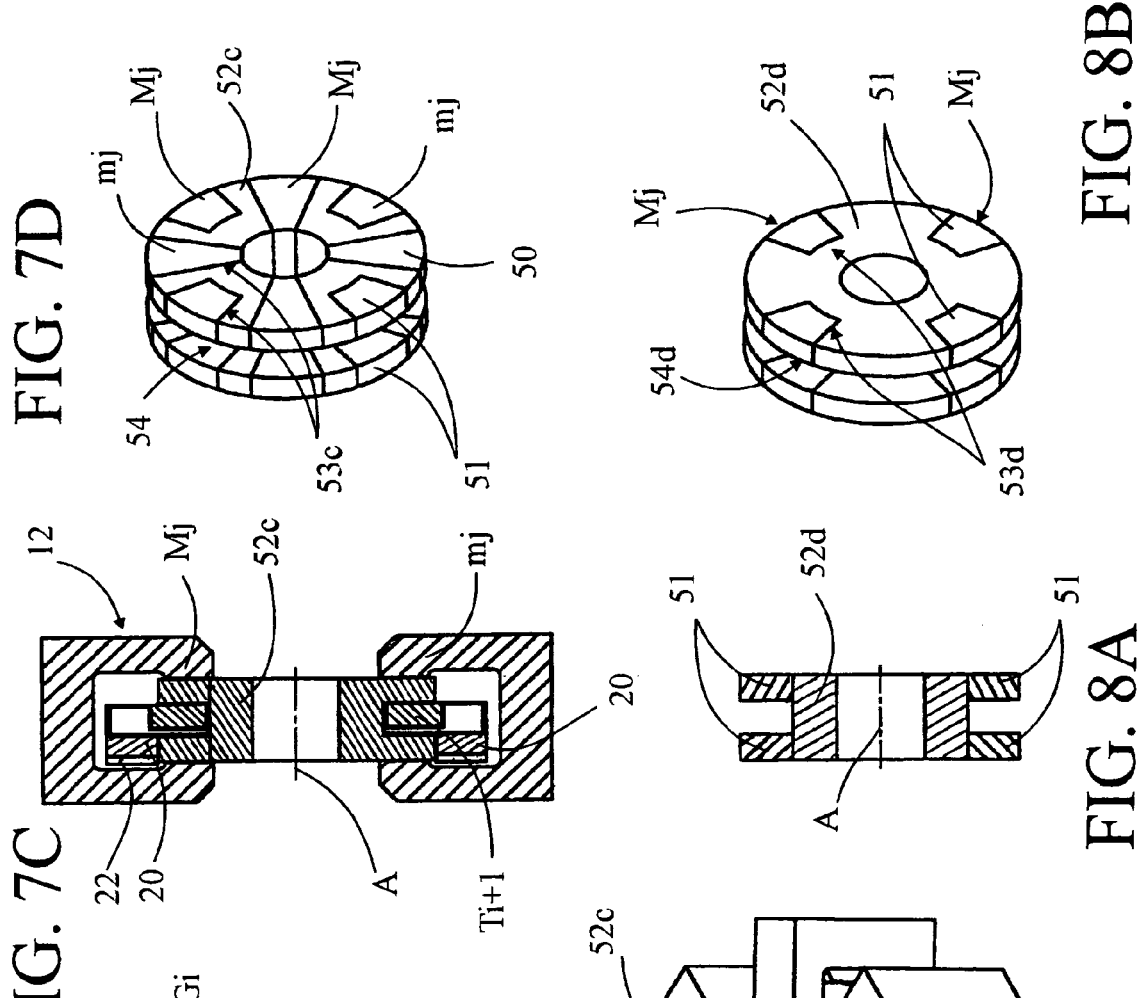
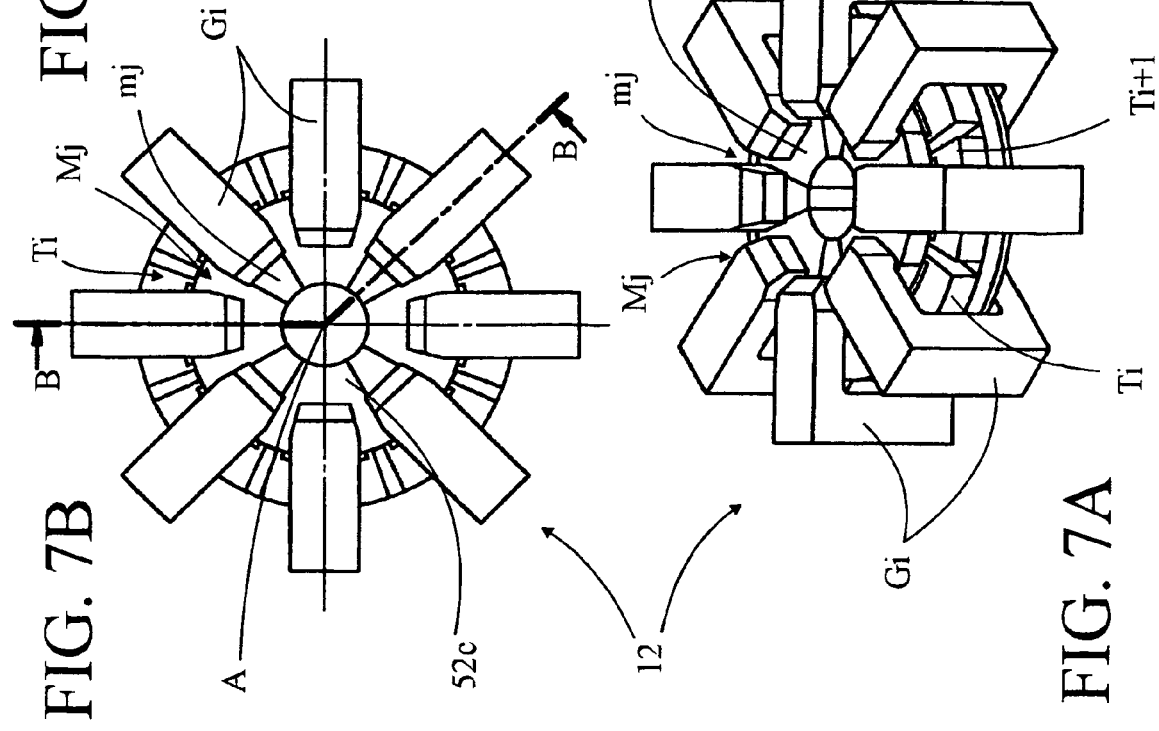

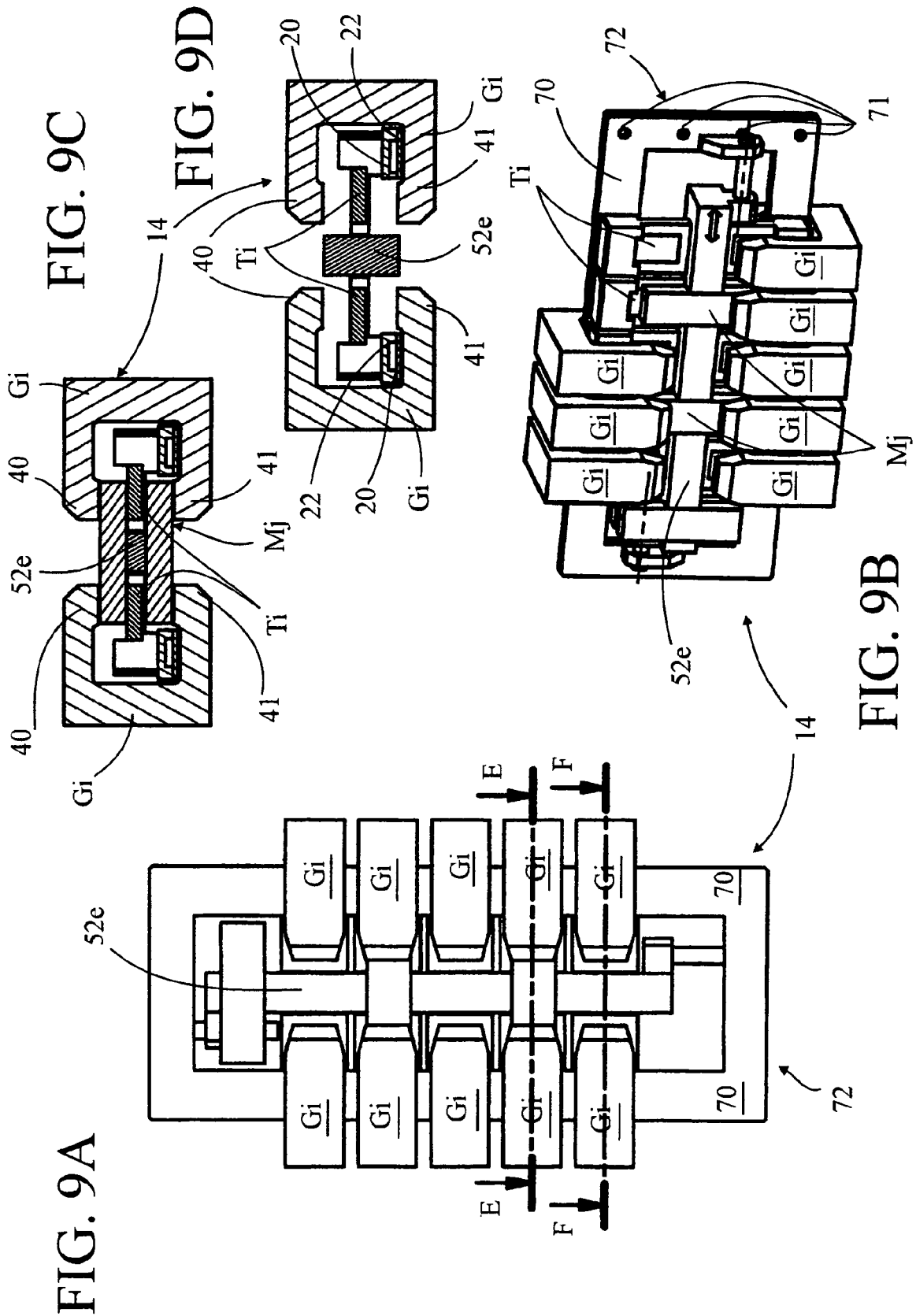

HEAT GENERATOR COMPRISING A MAGNETO-CALORIC MATERIAL AND THERMIE GENERATING METHOD

This application is a national stage completion of PCT/FR2005/000741 filed Mar. 29, 2005 which claims priority from French Application Serial No. 0403300 filed Mar. 30, 2004.

FIELD OF THE INVENTION

The present invention concerns a heat generator with magneto-caloric material comprising at least one thermal element and at least one magnetic element in order to generate a magnetic field, said thermal element being located opposite the magnetic element so it can be subjected to at least a portion of the magnetic field, and said heat generator also comprising a magnetic modulation means to vary the magnetic field received by the thermal element and a means for recovering at least a portion of the thermies generated by the thermal element subjected to this variable magnetic field.

The invention also concerns a method of generating thermies whereby at least one thermal element is subjected to at least one portion of a magnetic field generated by at least one magnetic element, the magnetic modulation means modulates the magnetic field received by thermal element, and at least a portion of the thermies generated by the thermal element subjected to this variable magnetic field are recovered.

BACKGROUND OF THE INVENTION

Existing magneto-caloric material heat generators utilize the magneto-caloric properties of certain materials such as gadolinium or certain alloys that have the ability to heat up when subjected to a magnetic field and cool down to a lower temperature than their initial temperature when the magnetic field disappears or weakens. Actually, as they pass before the magnetic field, the magnetic moments of the magneto-caloric material become aligned, causing a rearrangement of the atoms that generate the heating of the magneto-caloric material. When they are outside the magnetic field or if the magnetic field becomes weaker, the process is reversed and the magneto-caloric material cools down to a temperature lower than its initial temperature.

A team of U.S. researchers has developed a working prototype of a magneto-caloric material heat generator comprising a disc formed of thermal sectors containing a magneto-caloric material in the form of a gadolinium alloy. This disc is guided in continuous rotation on its axis so as to cause its thermal sectors to pass inside and outside a magnetic field created by a fixed permanent magnet overlapping a portion of the disc. Opposite the permanent magnet, the disc passes through a thermal transfer block comprising two heat-transmitting fluid circuits, one of which is designed to transport calories and the other to transport frigories generated by the thermal sectors alternately subjected to the presence and absence of the magnetic field. The thermal transfer block comprises orifices opening onto the rotating disc and allowing contact between the heat-transmitting fluid and the rotating thermal sectors. Despite the existence of turning seals, it is very difficult to form a tight seal between the thermal sectors and the thermal transfer block without penalizing the global output of the thermal generator. Moreover, each time a thermal sector is either subjected or not subjected to the magnetic field and therefore heated or cooled, it is necessary to switch the inlets and outlets corresponding to the hot circuit or the cold circuit. As a result, this device is complex, unreliable, limited in output and unsatisfactory.

Publication WO-A-03/050456 describes a heat generator essentially similar to the preceding one and using two permanent magnets. This heat generator comprises an annular monobloc housing defining twelve thermal compartments separated by seals and each receiving gadolinium in porous form. Each thermal compartment is provided with a minimum of four orifices, one inlet orifice and one outlet orifice connected to a hot circuit, and one inlet orifice and one outlet orifice connected to a cold circuit. The two permanent magnets are driven in continuous rotation so that they sweep the different thermal compartments while successively subjecting them to a magnetic field. The calories and/or frigories emitted by the thermal compartments are guided towards the heat exchangers by the hot and cold heat-transmitting circuits to which they are successively connected using several rotating seals which are connected in rotation by one or more belts to the continuous rotation axle of the two magnets. This heat generator simulates the operation of a liquid ring.

In order to operate, this heat generator requires continuous, synchronized, precise rotation by the different rotating seals and permanent magnets. The switching and sealing requirements associated with this rotation make this heat generator technically difficult and expensive to manufacture. Additionally, the principle of continuous operation severely limits this heat generator's perspectives of technical evolution.

SUMMARY OF THE INVENTION

The present invention proposes overcoming these disadvantages by offering a heat generator comprising magneto-caloric material that is efficient, reliable, simple in design, economical, consumes little electrical energy, has a high output, does not require displacement of the magneto-caloric elements to be synchronized, does not require any means for alternately switching from cold to hot circuits as described above relative to the U.S. research prototype, significantly reduces the inert mass to be displaced in order to vary the magnetic field necessary for producing the magneto-caloric effect, and is equally useful in large scale industrial applications and domestic applications.

To achieve this, the invention concerns a heat generator comprising magneto-caloric material of the type indicated in the preamble, characterized in that the magnet modulation means comprise at least one magnetic modulation element, magnetically conductive, joined to a displacement means which alternately displaces it relative to the magnetic element and the thermal element between an active position in which it is close to the magnetic element and the thermal element, positioned to channel at least the portion of the magnetic field to be received by the thermal element, and an inactive position in which it is farther away from the magnetic element and/or the thermal element and positioned to have no effect on this portion of the magnetic field.

The magnetic modulation element may be a magnetic convergence element made of material with higher magnetic conductivity than the conductivity existing in the ambient milieu separating the magnetic element and the thermal element, said magnetic convergence element being disposed so that in the active position, it promotes passage of the magnetic field toward the thermal element, resulting in an increase in the strength of the magnetic field crossing it.

The magnetic modulation element may also be a magnetic divergence element made of material with higher magnetic conductivity than the material in the thermal element, said magnetic divergence element having at least one shape capable of bypassing the thermal element and in the active position, deflecting at least one portion of the magnetic field from the thermal element, resulting in a decrease in the strength of the magnetic field crossing it.

The magnetic modulation element is advantageously made of at least one of the materials from the group consisting of soft iron, ferrites, iron alloys, chromium, vanadium, composites, nano-composites, permalloys.

According to a preferred embodiment, the thermal generator comprises at least one magnetic convergence element, also called a magnetic lens, and at least one magnetic divergence element, also called a thermal diverter or shunt, disposed to alternately promote passage of the magnetic field toward the thermal element and deflect the magnetic field away from the thermal element.

In the active position the magnetic modulation element is advantageously interposed between the magnetic element and the thermal element.

The magnetic element preferably comprises at least one positive magnetic terminal and at least one negative magnetic terminal, with the thermal element being located between the magnetic terminals, and the magnetic modulation element, at least when in the active position, interposed between at least the magnetic terminals.

Advantageously:

the magnetic convergence element may comprise two convergence pellets placed, when in the active position, on either side of the thermal element between the thermal element and the magnetic terminals; and/or the magnetic divergence element may be U-shaped or C-shaped so that, at least when in the active position, it overlaps the thermal element between the thermal element and the magnetic terminals.

According to another advantageous disposition, the magnetic divergence element mj comprises at least one contact which, when in the active position, may be tangential to thermal elements Ti and to the magnetic terminals, while the air-gap separating thermal element Ti from magnetic terminals 40, 41 remains free. This piece may range from 0 mm to 50 mm in size and is preferably smaller than 1 mm.

The magnetic element may be U-shaped or C-shaped, without shape limitation, so that it overlaps said magnetic modulation element.

The displacement means may be designed to drive the magnetic modulation element in at least one of the following displacement modes: continuous rotation, stepping rotation, alternate pivoting, continuous translation, stepping translation, alternate translation, or a combination of these displacements.

The displacement means is preferably associated with an actuation means selected from the group consisting of a motor, a cylinder, a spring mechanism, an aerogenerator, an electromagnet, a hydrogenerator, or a manual mechanism.

The magnetic modulation element is advantageously held by a support coupled with the displacement means and made of magnetically insulating material selected from the group comprised of synthetic materials, brass, aluminum, or ceramic.

The thermal generator preferably comprises at least one unit of magnetic elements and one unit of thermal elements, each to be subjected to the magnetic field from at least one of the magnetic elements; and one unit of magnetic modulation elements held by a support coupled with the displacement means and designed to simultaneously displace the magnetic modulation means so that, in relation to a given thermal element and magnetic element, each of them alternates between an active and an inactive position.

According to a first embodiment, the support comprises at least one generally circular platform, rotationally movable on its axis, with the thermal elements disposed in a ring and the magnetic elements forming at least one pair of rims defining the positive and negative magnetic terminals.

In this configuration the platform is preferably equipped with a groove defining the interval that separates the convergence pellets on the magnetic convergence elements from each other and/or the U-shaped or C-shaped opening on the magnetic divergence elements. This groove may be axial and generally parallel to the axis of the platform, or radial and generally perpendicular to the axis of the platform.

According to a second embodiment the support comprises at least one generally rectilinear bar, translationally movable, with the thermal elements disposed along at least one line supported by a cross piece and the magnetic elements forming at least one pair of rows defining the positive and negative magnetic terminals.

In this configuration the thermal elements may be disposed in two generally parallel lines supported by the connected cross pieces and defining a frame.

Advantageously, the magnetic elements may be formed of a single piece.

The magnetic element is preferably selected from the group consisting of a magnetic assemblage, a permanent magnet, an electromagnet, a superconductive magnet, a superconductive electromagnet, or a superconductor.

According to a particular embodiment, the magnetic element and the thermal element are fixed and only the magnetic modulation element is movable.

Advantageously, the recovery means comprises at least one of the elements from the group consisting of a transport circuit containing heat-transmitting fluid, a means for circulating said heat-transmitting fluid, or a heat exchanger.

The invention also concerns a thermie-generating method of the type indicated in the preamble, characterized in that in order to vary the magnetic field received by the thermal element, at least one magnetically-conductive magnetic modulation element is used, which is displaced between at least an active position in which it is located near the magnetic element and the thermal element so as to channel at least the portion of the magnetic field that will be received by the thermal element, and an inactive position in which it is located at a distance from the magnetic element and/or the thermal element so that it has no effect on this portion of the magnetic field.

Preferably at least one magnetic element is used, defining at least one positive terminal and one negative terminal with the thermal element being located between them; in the active position the magnetic modulation element is interposed between at least the magnetic terminals of the magnetic element.

BRIEF DESCRIPTION OF THE DRAWINGS

The present invention and its features will be more apparent from the following description of several embodiments given by way of non-limiting examples and with reference to the attached drawings, wherein:

FIGS. 2A-2C are perspectives essentially similar to the preceding view in which the thermal generator is shown in different stages of assembly;

FIG. 3A is an overhead view of the thermal generator of FIG. 2A and

FIGS. 3B and 3C are cross-sections taken along plane AA of FIG. 3A;

FIGS. 4A and 4B are views from below and in perspective, respectively, of the magnetic modulation element of FIG. 3A, and FIG. 4C is a cross-section taken along plane BB in FIG. 4A;

FIG. 5A is a view similar to FIG. 3A of the heat generator of the invention according to a second embodiment, and FIGS. 5B and 5C are cross-sections taken along plane CC of FIG. 5A;

FIGS. 6A and 6B are a view from below and a perspective view, respectively, of the magnetic modulation element of FIG. 5A, and FIG. 6C is a cross-section taken along plane DD of FIG. 6A;

FIGS. 7A-7D are perspective views, an overhead view, and a cross-section, respectively, of the thermal generator of the invention according to a variation, while FIG. 7D is a perspective of the magnetic modulation element of FIG. 7C;

FIGS. 8A and 8B are a cross-section and a perspective, respectively, of another variation of the magnetic modulation element;

FIGS. 9A and 9B are an overhead and a perspective view, respectively, of a third embodiment of the heat generator according to the invention;

FIGS. 9C and 9D are cross-sections of the device of in the drawings taken along planes EE and FF, respectively, of the generator of FIG. 9A.

DETAILED DESCRIPTION OF THE INVENTION

Figure 1:
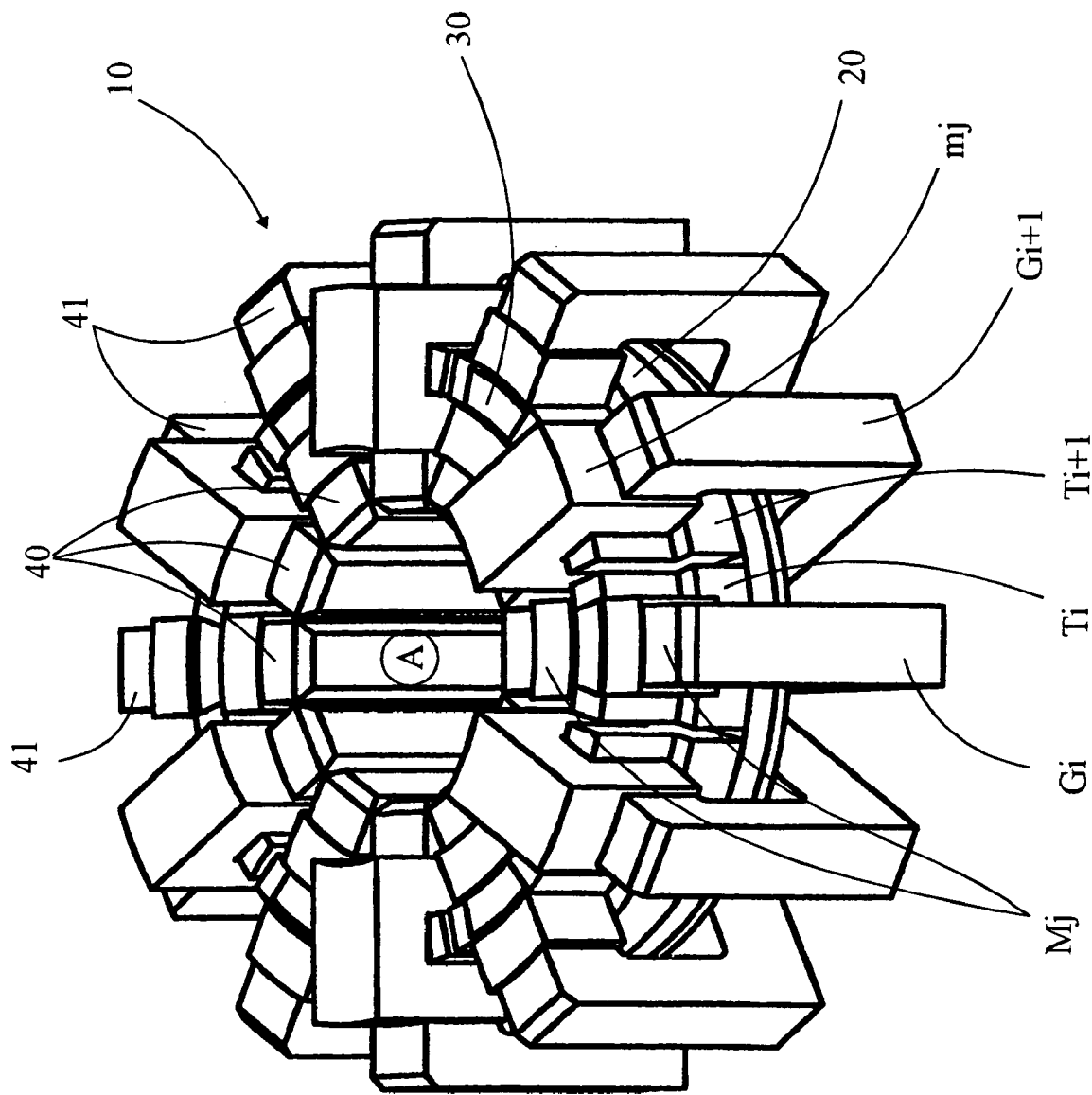
FIG. 1 is a perspective of a partially assembled thermal generator according to a first embodiment of the invention.

As is known in the art, a magneto-caloric material heat generator comprises thermal elements Ti subjected to the magnetic field generated by magnetic elements Gi. Thermal elements Ti contain a magneto-caloric material such as, for example, gadolinium (Gd), a gadolinium alloy which may contain silicon (Si), for example, germanium (Ge), iron (Fe), magnesium (Mg), phosphorous (P), arsenic (As) or any other equivalent magneto-caloric material or alloy. Generally, the magneto-caloric material may be in the form of a block, a pellet, a powder, a conglomerate of pieces, or any other adapted form and it may have as its base a single material or a combination of several magneto-caloric materials.

Magnetic elements Gi may comprise one or more full, fritted, or layered permanent magnets associated with one or more magnetizable materials concentrating and directing the lines of the magnetic field of the permanent magnet. The magnetizable materials may contain iron (Fe), cobalt (Co), vanadium (V), soft iron, an assemblage of these materials, or any equivalent material. Any other equivalent type of magnet such as a magnetic assemblage, an electromagnet, a superconductive magnet, a superconductive electromagnet, or a superconductor can obviously be used.

For purposes of simplicity, the remainder of the description will use the term generator to denote the magneto-caloric material heat generator according to the invention.

Before embarking upon a detailed description of the construction of the various embodiments of the generator according to the invention, the general principles of operation will be described below with reference to all the drawings.

This generator 10-14 comprises magnetic modulation elements Mj, mj made of magnetically conductive material such as, for example, soft iron, ferrites, iron alloys, chromium, vanadium, composites, nanocomposites, permalloys or any other material with similar properties. Each magnetic modulation element Mj, mj is associated with a displacement means (not shown) so as to move alternately between an active and an inactive position relative to thermal elements Ti and magnetic elements Gi in order to create a variation in the magnetic field received by thermal elements Ti.

In the active position, each magnetic modulation element Mj, mj is close to a magnetic element Gi and a thermal element Ti to promote passage of the magnetic field emitted by magnetic element Gi through magnetic modulation element Mj, mj toward thermal element Ti, generating an increase in the magnetic field received by thermal element Ti.

In the inactive position, magnetic modulation element Mj, mj is distanced from magnetic element Gi and/or thermal element Ti so it no longer has an appreciable impact on the magnetic filed emitted by magnetic element Gi, generating a decrease or a variation in the magnetic field received by thermal element Ti.

It is apparent that the active position of magnetic modulation element Mj, mj relative to a pair of magnetic elements Gi and thermal elements Ti may correspond to the inactive position of the same magnetic modulation element Mj, mj relative to a pair of magnetic elements Gi+1 and thermal elements Ti+1, the latter elements being located adjacent to the preceding ones, for example.

The magnetic modulation elements may be magnetic convergence elements Mj made of material with a higher magnetic conductivity than the conductivity existing between magnetic elements Gi and thermal elements Ti, for example, that of the air. In the active position these magnetic convergence elements Mj promote the passage of the magnetic field through them, then through thermal elements Ti located opposite them. Thus, when magnetic convergence element Mj is approached by a pair of magnetic elements Gi and thermal elements Ti in the active position, thermal element Ti is subjected to a stronger magnetic field than it is subjected to when magnetic convergence element Mj is distanced from the pair of magnetic elements Gi and thermal elements Ti in the inactive position.

The magnetic modulation elements may also be magnetic divergence elements mj made of a material with higher magnetic conductivity than thermal elements Ti, and each having a shape that allows it to bypass thermal element Ti. In the active position these magnetic divergence elements mj promote the passage of the magnetic field through them, with the magnetic field bypassing thermal element Ti opposite it. Thus, when magnetic divergence element mj is approached by a pair of magnetic elements Gi and thermal elements Ti in the active position, thermal element Ti is subjected to a null magnetic field or at least a weaker field than when magnetic divergence field mj is distanced from the pair of magnetic elements Gi and thermal element Ti in the inactive position.

As detailed below, it is of course possible to strengthen the effectiveness of the two types of magnetic modulation elements Mj, mj by alternately using, with each pair of magnetic elements Gi and thermal elements Ti, one magnetic divergence element mj and one magnetic convergence element Mj.

With reference to FIGS. 1 through 6 and according to a first embodiment, generator 10-11 comprises a unit of twelve thermal elements Ti arranged in a circle around center A on annular interface plate 20 to form a thermal ring. Each thermal element T comprises a block of magneto-caloric material 30 and is traversed by two conduits (not shown) opening through the hot and cold inlet orifices and the hot and cold outlet orifices. These conduits are designed to respectively receive the heat-transmitting fluid to be heated and the heat-transmitting fluid to be cooled.

Interface plate 20 is made of mechanically rigid thermal insulating material such as, for example, a composite material, a synthetic material, or any other equivalent material. It is sealed by sealing plate 22 made of mechanically rigid thermal insulating material such as example, a composite material, a synthetic material, or any other equivalent material. It comprises four orifices 21, one of which is a cold circuit supply orifice, one a cold circuit discharge orifice, one a hot circuit supply orifice, and one a hot circuit discharge orifice. These orifices 21 are designed to be joined through conventional connection and distribution means (not shown) to an external hot circuit and an external cold circuit (not shown). Since thermal elements Ti are fixed, the connection of the external cold and hot circuits to supply and discharge orifices 21 is accomplished using simple hydraulic connectors, which may or may not be rapid connectors.

The external hot and cold circuits may be formed, for example, of rigid, semi-rigid, or flexible conduits through which the heat-transmitting fluid circulates, each connected to one or more heat exchangers (not shown) or some other equivalent calorie and frigorie recovery means. As described below, in this way this heat exchanger 10-11 allows simultaneous recovery of the calories and frigories emitted by thermal elements Ti in the thermal ring.

The heat-transmitting fluid is circulated through the use of a forced or free circulation means (not shown) such as a pump or other equivalent means, for example. The choice of heat-transmitting fluids used depends upon the range of temperature desired. For example, pure water is used for positive temperatures and water with antifreeze added for negative temperatures. For very low temperatures, a gas such as helium may be used as the heat-transmitting fluid.

Supply and discharge orifices 21 on each of the hot and cold circuits are interconnected by internal hot and cold channels (not shown) on interface plate 20, opening opposite inlet and outlet orifices on thermal elements Ti, respectively. Thus, the hot channel connects the supply and discharge orifices on the hot circuit with the hot inlet and outlet orifices. Likewise, the cold channel connects the supply and discharge orifices on the cold circuit with the cold inlet and outlet orifices. These channels may connect thermal elements Ti in parallel or in series. They may be made by machining or molding, for example.

Generator 10-11 comprises twelve magnetic elements Gi, each U-shaped or C-shaped, defining a positive magnetic terminal 40 and a negative magnetic terminal 41. These magnetic elements Gi are arranged at a distance in a concentric circle around center A so as to overlap thermal elements Ti on the thermal ring. Obviously, magnetic elements Gi may have any other appropriate shape.

With reference to FIGS. 1 through 4C, the U-shaped or C-shaped openings on magnetic elements Gi are oriented axially, generally parallel to the axis of the circle passing through A and defined by magnetic element Gi so as to define, relative to the thermal ring, an exterior magnetic rim—for example, a negative rim, and an interior magnetic rim—for example, a positive rim, or conversely, or a combination of pairs of positive or negative terminals in no particular order. Thus, each thermal element Ti is located between a positive magnetic terminal 40 and a negative magnetic terminal 41.

The magnetic modulation means comprises six magnetic convergence elements Mj and six magnetic divergence elements mj arranged in a circle with center A in an alternating pattern and held by support 52a. Magnetic convergence elements Mj comprise two convergence pellets 50 located opposite each other and separated by a space large enough to receive a thermal element Ti without any contact between these thermal elements Ti and magnetic terminals 40, 41 surrounding them. Magnetic divergence elements mj each define a U-shape or C-shape 51 that overlaps certain thermal elements Ti between these thermal elements Ti and the magnetic terminals 40, 41 that surround them.

In this example magnetic convergence elements Mj and magnetic divergence elements mj are arranged in an alternate pattern on support 52a. Thus, in a given position, magnetic convergence elements Mj are in the immediate environment of every other thermal element Ti, Ti+2 and magnetic divergence elements mj are located in the immediate environment of every other thermal element Ti+1, Ti+3. The support comprises a generally circular platform 52a coaxial to the magnetic rims and the thermal ring. Convergence pellets 50 and U-shaped or C-shaped divergence elements 51 are integrated with platform 52 equipped with housings 53a for this purpose (cf. FIGS. 4B, 4C) which receive them and a slot 54a (cf. FIGS. 4A, 4B) defining spaces in which thermal elements Ti circulate freely without contact. This platform 52a is made of magnetically insulating material such as, for example, synthetic materials, brass, bronze, aluminum, ceramic, etc. It is joined to a displacement means (not shown) so as to be rotationally movable around its axis passing through A.

The displacement means may be connected to an actuation means such as a motor, a cylinder, a spring mechanism, an aerogenerator, an electromagnet, a hydrogenerator, or any other suitable actuator. They drive platform 52a in displacement, for example, in continuous rotation, stepping rotation, alternate pivoting, or any combination of these displacements.

The operation of generator 10 can be broken down into two steps that occur either continuously, in stepping movement, or alternately, depending upon the displacement means used. By way of example, the two steps are described below sequentially. Obviously the passage from one stage to the next may be progressive. It will be assumed arbitrarily that magnetic elements Gi emit their magnetic field permanently.

During the first step, and simultaneously:

The magnetic convergence elements Mj disposed between each thermal element Ti, Ti+2 and the corresponding magnetic elements Gi focus the lines of the magnetic fields generated by these magnetic elements Gi to promote their passage through the elements and through thermal elements Ti, Ti+2. Thus, magnetic convergence elements Mj are in the active position relative to thermal elements Ti, Ti+2, which receive a larger amount of the magnetic field than they would have received absent these magnetic convergence elements Mj. Furthermore, these same magnetic convergence elements Mj are in an inactive position relative to adjacent thermal elements Ti+1 and Ti+3, over which they exert no influence relative to the magnetic fields to which they are subjected. Thermal elements Ti, Ti+2, subjected to the increased magnetic field, heat up. They transmit their calories to the hot heat-transmitting fluid in the hot circuit toward the calorie exchangers.

Magnetic divergence elements mj disposed between each thermal element Ti+1, Ti+3 and corresponding magnetic elements Gi diverge and deflect along their U-shape or C-shape the lines of the magnetic fields generated by these magnetic elements Gi which bypass thermal elements Ti+1, Ti+3. Thus, magnetic divergence elements mj are in the active position relative to thermal elements Ti+1 and Ti+3 which receive a nearly non-existent quantity of the magnetic field and in any event, clearly less than they would have received absent magnetic convergence elements mj. Furthermore, these same magnetic divergence elements mj are in the inactive position relative to adjacent thermal elements Ti, Ti+2 over which they exert no influence relative to the magnetic fields to which they are subjected. Thermal elements Ti, Ti+2, subjected to the reduced magnetic field, cool down and transmit their frigories to the cold heat-transmitting fluid in the cold circuit toward the thermie exchangers.

Then, the following effects occur simultaneously:

a magnetic convergence toward thermal elements Ti, Ti+2 which become heated with the intervention of magnetic elements Mj, and a magnetic divergence relative to thermal elements Ti+1, Ti+3, which become cool.

To pass from the first step to the second, the displacement means drives platform 52a one step corresponding to the distance between the centers separating the two adjacent thermal elements Ti, Ti+1 so as to move:

magnetic convergence elements Mj between thermal elements Ti+1, Ti+3 and corresponding magnetic elements Gi, and magnetic divergence elements mj between thermal elements Ti, Ti+2 and corresponding magnetic elements Gi.

Thermal elements Ti+1, Ti+3, subjected to an increased magnetic field, heat up and transmit their calories, while thermal elements Ti, Ti+2, subjected to a weaker magnetic field, cool down and transmit their frigories.

The passage from the second step to a new step begins with the rotation of platform 52a and so forth, each of the thermal elements Ti, Ti1, Ti+2, Ti+3 being thus alternately subjected to the increased and decreased magnetic field, causing a variation in the magnetic field which favors the production of frigories and/or calories.

With reference to FIGS. 5 and 6, generator 11 is distinguished from the preceding one by the fact that the magnetic modulation means comprises six magnetic convergence elements Mj, but no magnetic divergence elements. Magnetic convergence elements Mj are arranged essentially identically to the preceding example, with platform 52b being solid between magnetic convergence elements Mj.

The operation of this generator 11 is generally similar to preceding generator 10. Every other thermal element Ti, Ti+2 is subjected through the intervention of a magnetic convergence element Mj to an increased magnetic field. The other thermal elements (not shown) are subjected to a decreased magnetic field, the latter being diffused and restricted by the U-shape of platform 52b whose magnetically insulating or neutral branches 55 (cf. FIGS. 6A, 6B, 6C) are interposed between magnetic elements Gi and thermal elements Ti. The platform 52b is equipped with housing 53b.

With reference to FIGS. 7 and 8, generators 12 are essentially identical to the preceding ones. They are distinguished primarily by the fact that they comprise eight magnetic elements Gi and eight thermal elements Ti. In addition, the U-shaped and C-shaped openings on magnetic elements Gi are oriented radially and generally perpendicular to the axis passing through A, defining two magnetic rims of generally equal diameter with center A. Thus, slots 54c-d in platform 52c-d are formed radially. The operation of generators 12 is essentially similar to that of the preceding generators. The platform 52c. 52d is equipped with housings 53c and 53d.

In the example in FIGS. 7A-7D, the magnetic modulation means comprises four magnetic convergence elements Mj and four magnetic divergence elements mj arranged in alternation and supported by platform 52c.

In the example in FIGS. 8A and 8B, the magnetic modulation means comprises four magnetic convergence elements Mj, but no magnetic divergence elements. Magnetic convergence elements Mj comprise U or C-shapes with branches defining convergence pellets 51 arranged generally the same as in the preceding example, platform 52d being solid between these magnetic convergence elements Mj so as to be interposed in the magnetic field.

FIGS. 9A-9D illustrate another embodiment of generator 14 according to the invention. This generator 14 comprises ten thermal elements Ti disposed along two lines held by interconnected cross-pieces 70 forming a frame 72. This frame 72 comprises supply and discharge orifices 71 for the cold and hot circuits connected as previously described through channels that are not shown.

Said generator 14 comprises three magnetic modulation elements Mj held by a support comprising a generally rectilinear bar 52e provided between the lines of thermal elements Ti. Said bar 52e is made of mechanically rigid thermal insulating material, for example, a composite material, synthetic material, or any other equivalent material. Magnetic modulation elements Mj are arranged on either side of bar 52e so as to overlap every other pair of thermal elements Ti, Ti+2 or Ti+1, Ti+3.

In this example, the magnetic modulation elements are magnetic convergence elements Mj. It is possible, of course, for an essentially similar generator to use magnetic divergence elements.

Bar 52e is connected with the displacement means in order to move in translation and thereby displace magnetic convergence elements Mj relative to thermal elements Ti. This translation may be continuous, stepping, or alternating. Said generator 14 comprises ten magnetic elements Gi that are U-shaped, C-shaped, or the like, aligned in rows, each row defining positive magnetic terminals 40 and negative magnetic terminals 41 (Cf. FIGS. 9C and 9D), overlapping thermal elements Ti either above magnetic convergence elements Mj or elsewhere.

The operation of said generator 14 is essentially similar to generator 11 in FIGS. 6 and 8. However, it is distinguished from it by the fact that between two magnetic convergence elements Mj, the magnetic field is not blocked or limited by bar 52e as it was by platform 52b, 52d, but simply by air or the ambient milieu existing between magnetic elements Gi and thermal elements Ti. The variation in the magnetic field is therefore obtained by virtue of the different magnetic conductivity between the air and/or the ambient milieu and the magnetically conductive material of magnetic convergence elements Mj.

In the examples described, magnetic elements Gi and thermal elements Ti are fixed. Obviously, if it is necessary for the general operation of an installation, one or the other could be movable.

According to a variation not shown, the magnetic elements may be made of one single piece. In the case of circular generators, there may be solid exterior and interior rims and/or an interior hub.

Figure 10:
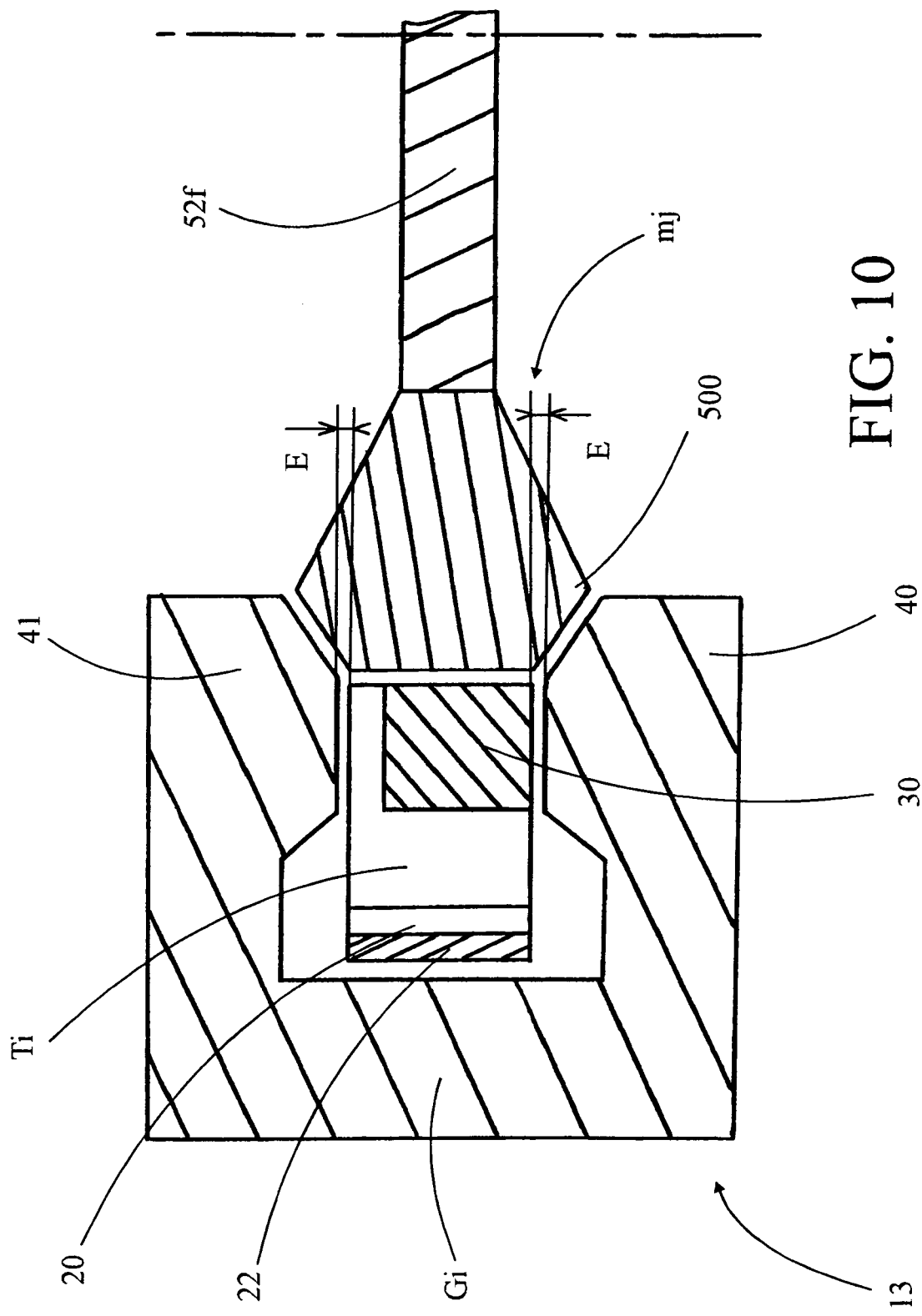
FIG. 10 is a sectional representation of a fourth embodiment of a heat generator according to the invention.

According to another embodiment shown in FIG. 10, the magnetic modulation means are tangential to the magnetic elements and the thermal elements and are not located between them. In this example, generator 13 comprises magnetic divergence elements mj held by platform 52f with axis A, rotationally movable and alternating with the solid zones on platform 52f. Each magnetic divergence element mj comprises at least one contact 500 with shapes complementary to those of thermal element Ti and magnetic terminals 40, 41 so that in the active position, it can be interposed between magnetic terminals 40, 41 without, however, being interposed between magnetic terminals 40, 41 and thermal element Ti. In the active position, thermal element Ti is tangential to thermal elements Ti and magnetic terminals 40, 41. The thermal elements are separated from magnetic terminals 40, 41 by an air-gap E ranging from 0 mm to 50 mm and preferably less than 1 mm. This air-gap E remains free in the active and inactive positions and allows the magnetic field to pass between magnetic terminals 40, 41 and thermal element Ti.

The operation of this generator 13 is essentially similar to generator 11 previously described with the difference that here magnetic divergence elements mj, rather than magnetic convergence elements, are used. In the inactive position, magnetic divergence element mj is distanced from thermal element Ti and from magnetic terminals 40, 41. For this reason, the magnetic field passes freely through thermal element Ti, which becomes heated. In the active position, magnetic divergence element mj is tangential to thermal element Ti and to magnetic terminals 40, 41. Since magnetic divergence element mj has a higher magnetic conductivity than the air or the ambient milieu of air-gap E, the magnetic field is deflected, avoiding thermal element Ti, which cools down.

This generator 10-14 may be or may not connected to other similar generators, said connection being either a series, parallel, or series/parallel combination, in order to increase the thermal capacity of an installation without complicating either its operation or architecture, since it is easy to achieve displacement of the magnetic modulation elements. Each generator 10-14 may comprise a different number of thermal elements, magnetic elements, and/or magnetic modulation elements from what has been described, there being no limit to the number.

Thus, generator 10-14 provides a simple means for producing frigories and/or calories, since only the magnetic modulation means needs to be displaced. These frigories and calories may be used to heat, cool, regulate, or air condition a building, a machine, or a place; they are useful in industrial applications as well as domestic ones. The particular design of this generator 10-4 eliminates any sealing problems in the thermal circuits and considerably limits the inert masses that must be displaced in order to achieve the magnetic field variations necessary for producing the magneto-caloric effect.

In the examples shown, the ambient milieu is the air. It is apparent that generator 10-14 could be used in any other type of adapted ambient milieu. It is also possible to use a generator 10-14 comprising a specific internal ambient milieu such as a gas, said generator 10-14 being located in a different external ambient milieu, for example, another gas or some other fluid. In these cases, the two ambient milieus could be isolated from each other by a case, for example.

From the description, it is clear that generator 10-14 of to the invention responds to the objectives set forth by proposing a generator 10-14 that is efficient, offers simplicity of design, operation, and maintenance, and therefore is less expensive to manufacture and use than conventional generators. In addition, it considerably limits the inert masses that must be displaced in order to achieve the variation in magnetic field necessary to produce the magneto-caloric effect.

The present invention is not limited to the exemplary embodiments described, but extends to any modification and variation obvious to a person skilled in the art while still remaining within the scope of protection defined by the attached claims.

The invention claimed is:

1. A heat generator (10-14) with magneto-caloric material comprising at least one thermal element (Ti), at least one magnetic element (Gi) for generating a magnetic field, said at least one thermal element (Ti) being located opposite said at least one magnetic element (Gi) so said at least one thermal element (Ti) being subjected to at least one portion of said magnetic field, said heat generator (10-14) also comprising magnetic modulation means (Mj, mj) for varying the magnetic field received by said at least one thermal element (Ti) and a means for recovering at least a portion of thermies generated by said at least one thermal element (Ti) subject to the variable magnetic field, said magnetic modulation means comprises at least one magnetic modulation element (Mj, mj) that is magnetically conductive, coupled with a displacement means for alternately displacing the magnetic modulation element relative to said at least one magnetic element (Gi) and to said at least one thermal element (Ti) between an active position, in which the magnetic modulation element is close to said at least one magnetic element (Gi) and said at least one thermal element (Ti) and channels at least the portion of said magnetic field that being received by said at least one thermal element (Ti), and an inactive position, in which the magnetic modulation element is distanced from at least one of said magnetic element (Gi) and said at least one thermal element (Ti) and has no effect on the portion of the magnetic field.

2. The heat generator (10, 11, 12, 14) according to claim 1, wherein the magnetic modulation element is a magnetic convergence element (Mj) made of a material with higher magnetic conductivity than a conductivity existing in an ambient milieu separating said magnetic element (Gi) and said thermal element (Ti) and said magnetic convergence element (Mj), when in the active position, promotes passage of said magnetic field toward said thermal element (Ti) resulting in an increase in the magnetic field crossing said thermal element (Ti).

3. The heat generator (10, 12) according to claim 2, wherein the heat generator comprises at least one magnetic divergence element (mj) for alternately promoting passage of the magnetic field toward said thermal element (Ti) and deflecting said magnetic field from said thermal element (Ti).

4. The heat generator (10, 11, 12, 14) according to claim 2, wherein the magnetic convergence element (Mj) comprises two convergence pellets (50) placed, when in the active position, on either side of said thermal element (Ti) between said thermal element (Ti) and said positive and said negative magnetic terminals (40, 41).

5. The heat generator (10-14) according to claim 4, wherein the no limitation in shape and designed to overlap said magnetic modulation element (Mj, mj).

6. The heat generator (10, 12, 13) according to claim 1, wherein the magnetic modulation element is a magnetic divergence element (mj) made of a material with higher magnetic conductivity than said thermal element (Ti), said magnetic divergence element (mj) has at least one shape that can bypass said thermal element (Ti) and designed so that in the active position, the magnetic divergence element (mj) deflects at least one portion of said magnetic field from said thermal element (Ti), thereby weakening the magnetic field that crosses said thermal element (Ti).

7. The heat generator (10, 12, 14) according to claims 6, wherein the magnetic divergence element (mj) has one of a U-shape and a C-shape (51), designed to overlap, at least in the active position, said thermal element (Ti) between said thermal element (Ti) and said positive and said negative magnetic terminals (40, 41).

8. The heat generator (13) according to claim 6, wherein the magnetic divergence element (mj) comprises at least one contact (50) which is located, when in the active position, tangential to said thermal elements (Ti) and to said positive and said negative magnetic terminals (40, 41), with an air-gap (E) which separates said thermal element (Ti) from said positive and said negative magnetic terminals (40, 41) remaining free.

9. The heat generator (13) according to claim 8, wherein the air-gap (E) ranges from 0 mm to 50 mm.

10. The heat generator (10-13) according to claim 9, wherein the displacement means is coupled with an actuation means selected from the group consisting of a motor, a cylinder, a spring mechanism, an aerogenerator, an electromagnet, a hydrogenerator and a manual mechanism.

11. The heat generator (10-14) according to claim 10, wherein the heat generator comprises at least a unit of magnetic elements (Gi); a unit of thermal elements (Ti), each of which is designed to be subjected to the magnetic field from at least one of said magnetic elements (Gi); and a unit of magnetic modulation elements (Mj, mj) held by a support (52a-f) coupled with said displacement means and designed to simultaneously displace said magnetic modulation elements (Mj, mj) so that each one of said magnetic modulation elements (Mj, mj) is alternately in an active and an inactive position relative to a given thermal element (Ti) and a given magnetic element (Gi).

12. The heat generator (12) according to claim 11, wherein the groove (54c, 54d) is disposed so as to be radial and essentially perpendicular to an axis of said platform (52c, 52d).

13. The heat generator according to claim 11, wherein the magnetic elements are formed from a single piece.

14. The heat generator (10-14) according to claim 1, wherein the magnetic modulation element (Mj, mj) is advantageously made of at least one material selected from the group consisting of soft iron, ferrites, iron alloys, chromium, vanadium, composites, nano-composites and permalloys.

15. The heat generator (10, 11, 12, 14) according to claim 1, wherein at least in the active position, said magnetic modulation element (Mj, mj) is interposed between said magnetic element (Gi) and said thermal element (Ti).

16. The heat generator (10-14) according to claim 1, wherein the magnetic element (Gi) comprises at least one positive magnetic terminal (40) and at least one negative magnetic terminal (41), and said thermal element (Ti) is located between said magnetic terminals (40, 41) and, at least in the active position, said magnetic modulation element (Mj, mj) is interposed between at least said positive and said negative magnetic terminals (40, 41).

17. The heat generator (10-13) according to claim 16, wherein a support comprises at least one generally circular platform (52a-d, 520 rotationally movable about an axis, said thermal elements (Ti) are arranged in a ring, and said magnetic elements (Gi) form at least one pair of rims defining said positive magnetic terminals (40) and negative magnetic terminals (41).

18. The heat generator (10-12) according to claim 17, wherein the platform (52a-d) is equipped with a groove (54a-d) defining an interval separating at least one of said convergence pellets (51) on said magnetic convergence elements (Mj) from one another and from an opening in said U-shaped and C-shaped portion (51) of said magnetic divergence elements (mj).

19. The heat generator (10, 11) according to claim 18, wherein the groove (54a, 54b) is disposed so as to be axial and essentially parallel to an axis of said platform (52a, 52b).

20. The heat generator (14) according to claim 16, wherein a support comprises at least one generally rectilinear, translationally movable bar (52e), said thermal elements (Ti) are disposed along at least one line supported by a cross piece (70), and said magnetic elements (Gi) form at least one pair of rows defining said positive magnetic terminals (40) and negative magnetic terminals (41).

21. The heat generator (14) according to claim 20, wherein the thermal elements (Ti) are disposed along two generally parallel lines supported by two connected cross pieces (70) defining a frame (72).

22. The heat generator (10-14) according to claim 1, wherein the displacement means drives said magnetic modulation element (Mj, mj) in at least one of the displacement modes selected from the group consisting of continuous rotation, stepped rotation, alternate pivoting, continuous translation, stepping translation, alternate translation and a combination of such displacement modes.

23. The heat generator (10-14) according to claim 1, wherein the magnetic modulation element (Mj, mj) is held by a support (52a-f) coupled with said displacement means and made of magnetically insulating material selected from the group consisting of a synthetic material, brass, bronze, aluminum and ceramic.

24. The heat generator (10-14) according to claim 1, wherein the magnetic element is selected from the group consisting of a magnetic assembly, a permanent magnet, an electromagnet, a superconductive magnet, a superconductive electromagnet and a superconductor.

25. The heat generator (10-14) according to claim 1, wherein the magnetic element (Gi) and said thermal element (Ti) are fixed and only the magnetic modulation element (Mj, mj) is movable.

26. The heat generator (10-14) according to claim 1, wherein the recovery means comprises at least one of the elements selected from the group consisting of a transport circuit containing a heat-transmitting fluid, a circulation means for said heat-transmitting fluid and a heat exchanger.

27. A method of generating thermies comprising the steps of:
creating a magnetic field with at least one magnetic element (Gi);
subjecting at least one thermal element (Ti) made of magneto-caloric material to at least one portion of said magnetic field;
using a magnetic modulation means (Mj, mj) to modulate said magnetic field received by said thermal element (Ti) in order to vary said magnetic field received by said thermal element (Ti); and
recovering at least a portion of the thermies generated by said thermal element (Ti) subjected to said variable magnetic field, and using at least one magnetically-conductive magnetic modulation element (Mj, mj) which is displaced between at least one active position wherein the magnetically-conductive magnetic modulation element (Mj, mj) is close to said magnetic element (Gi) and said thermal element (Ti) and channels at least said portion of the magnetic field that is received by said thermal element (Ti), and an inactive position wherein the magnetically-conductive magnetic modulation element (Mj, mj) is spaced from at least one of said magnetic element (Gi) and said thermal element (Ti) so that the magnetically-conductive magnetic modulation element (Mj, mj) does not channel this portion of the magnetic field.

28. The method according to claim 27, further comprising the step of using at least one magnetic element (Gi), defining at least one positive terminal (40) and one negative terminal (41) between which said thermal element (Ti) is located, and in the active position, said magnetic modulation element (Mj, mj) is interposed between at least said magnetic terminals (40, 41) on said magnetic element (Gi).

* * * * *